US012809333B2

(12) United States Patent
Chen

(10) Patent No.: US 12,809,333 B2
(45) Date of Patent: Nov. 24, 2026

(54) HEIGHT MEASUREMENT METHOD, QUALITY COMPENSATION METHOD, AND HEIGHT MEASUREMENT SYSTEM BASED ON HEIGHT MEASUREMENT ASSEMBLY OF NUMERICAL CONTROL APPARATUS

(71) Applicant: Moxin (Huzhou) Technology Co., LTD., Huzhou City (CN)

(72) Inventor: Tianrun Chen, Huzhou City (CN)

(73) Assignee: Moxin (Huzhou) Technology Co., LTD., Huzhou City (CN)

( * ) Notice: Subject to any disclaimer, the term of this patent is extended or adjusted under 35 U.S.C. 154(b) by 738 days.

(21) Appl. No.: 18/295,651

(22) Filed: Apr. 4, 2023

(65) Prior Publication Data

US 2024/0094699 A1 Mar. 21, 2024

(30) Foreign Application Priority Data

Sep. 21, 2022 (CN) ........................ 202211151016.3

(51) Int. Cl.
*G05B 19/401* (2006.01)
*B33Y 50/02* (2015.01)

(52) U.S. Cl.
CPC ............ *G05B 19/401* (2013.01); *B33Y 50/02* (2014.12)

(58) Field of Classification Search
CPC ....... G05B 19/401; B22F 12/90; B33Y 50/02; G01N 21/95684
See application file for complete search history.

(56) References Cited

U.S. PATENT DOCUMENTS

2019/0201979 A1* 7/2019 Huang .................... B22F 12/90
2022/0071073 A1* 3/2022 Shinyama ........ G01N 21/95684

FOREIGN PATENT DOCUMENTS

CN 103831975 A 6/2014
CN 113805529 A * 12/2021 ............ G01B 11/02

* cited by examiner

*Primary Examiner* — Lam S Nguyen
(74) *Attorney, Agent, or Firm* — Jose Cherson Weissbrot

(57) ABSTRACT

A height measurement method, quality compensation method, and height measurement system based on a height measurement assembly of a numerical control apparatus. The height measurement method includes driving the height measurement assembly to move on a coordinate axis of the numerical control apparatus through a preset positioning mechanism on a plane to be measured of an assembly to be measured, so as to obtain a preset movement distance corresponding to each movement; acquiring reflected light patterns of several planes to be measured through a photoelectric signal collection array in each movement process, and acquiring a distance between adjacent reflected light patterns through a processing portion; and acquiring a target height of the assembly to be measured through a preset height acquisition model according to each preset movement distance and the distance between adjacent reflected light patterns corresponding to each preset movement distance.

14 Claims, 4 Drawing Sheets

HEIGHT MEASUREMENT METHOD, QUALITY COMPENSATION METHOD, AND HEIGHT MEASUREMENT SYSTEM BASED ON HEIGHT MEASUREMENT ASSEMBLY OF NUMERICAL CONTROL APPARATUS

TECHNICAL FIELD

The present invention relates to the field of three-dimensional printing, and in particular to a height measurement method, quality compensation method, and height measurement system based on a height measurement assembly of a numerical control apparatus.

BACKGROUND ART

A numerical control apparatus can control a processing actuator to process, measure, etc. a suitable workpiece (the workpiece is an assembly to be measured in the present invention). Height measurement is a common function of the numerical control apparatus. Generally, the numerical control apparatus can process or measure the workpiece to be processed at a suitable position only upon the height information of the workpiece. Accurate measurement of the height of the workpiece to be processed is conducive to implementation of functions such as accurate tool setting (for engraving and milling apparatuses), precise focusing (for laser engraving apparatuses), desirable first-layer adhesion (for three-dimensional printing apparatuses), etc., thereby playing a vital role in improvement of processing precision and/or increase in processing success rate. Among existing numerical control apparatus based height measurement methods, a method employing an encoder on an electric motor or a grating ruler on a Z axis has high precision, but is costly; a method for controlling a processing actuator to process, measure, etc. a workpiece to be processed by mounting a contact switch on the processing actuator or a fixing frame has a low cost, but a processing head of the processing actuator is likely to interfere with a generation position of the workpiece to be processed, and a complex mechanical device is required to be configured for avoiding the interference; and other methods include those using inductive or capacitive proximity sensors, and having requirements on properties of planes. Therefore, it has become an urgent problem to be solved of how to implement a stable and reliable height measurement method with a low cost and high precision.

Furthermore, three-dimensional printers employing the fused deposition modeling/fused filament fabrication (FDM/FFF) technology are now widely applied to a variety of fields such as prototype processing, teaching, and toys, which is due to a low cost, simple use, etc. Positioning of a Z axis has a great impact on the precision of three-dimensional molding. Accurate positioning of the Z axis can make a lamination process and a movement in an XY plane smooth. On the contrary, since the printing flow is pre-calculated on the basis of the layer height, if the layer height has an error, over-extrusion or under-extrusion may be generated owing to mismatching between the printing flow and the layer height, the former of which will affect the outline size precision of the printed content, and the latter of which will affect the strength of the printed content and even directly lead to an adhesion failure between layers, making unsuccessful printing. Currently, numerous efforts have been made to optimize the mechanical structure design of the three-dimensional printers. For example, disclosed in Chinese Patent No. CN103831975A is a dual-screw rod dual-optical axis driving mechanism, which is to realize stabler driving and higher precision printing. However, generally, a Z-axis portion of the three-dimensional printer is heavy and difficult to precisely position. When a large current is loaded by a stepper electric motor in the case of driving a bulky object, a system is likely to be heated after long time work, and step missing is also likely to be caused.

As a result, there remains a need to measure a printing layer height and to perform corresponding compensation in a Z-axis direction through a control method, thereby solving the problem that an existing three-dimensional printer has a low Z-axis precision and thus affects a printing quality.

SUMMARY

In order to solve the problem that a method for controlling a processing actuator to process, measure, etc. a workpiece to be processed by mounting a contact switch on the processing actuator or a fixing frame has a low cost, but a processing head of the processing actuator is likely to interfere with a generation position of the workpiece to be processed, the present invention provides a height measurement method based on a height measurement assembly of a numerical control apparatus. The height measurement assembly includes a photoelectric signal collection array, a light source, a lens, and a processing portion, the light source being arranged on one side of the photoelectric signal collection array, light emitted out by the light source irradiating a plane to be measured of an assembly to be measured, and the lens being configured for focusing the light emitted out by the light source. The height measurement method principally includes:

A1: driving the height measurement assembly to move on a coordinate axis of the numerical control apparatus through a preset positioning mechanism on the plane to be measured of the assembly to be measured, so as to obtain a preset movement distance corresponding to each movement; and acquiring reflected light patterns of several planes to be measured through the photoelectric signal collection array in each movement process, and acquiring a distance between adjacent reflected light patterns through the processing portion; and A2: acquiring a target height of the assembly to be measured through a preset height acquisition model according to each preset movement distance and the distance between adjacent reflected light patterns corresponding to each preset movement distance.

Further, a method for acquiring the preset height acquisition model includes:

B1: collecting several height points, within a standard height measurement range of the height measurement assembly, of a standard assembly;

B2: driving the height measurement assembly to move on the coordinate axis of the numerical control apparatus by any distance through the preset positioning mechanism at each height point, so as to obtain a movement distance, at each height point, of the height measurement assembly;

B3: acquiring reflected light patterns of several standard planes through the photoelectric signal collection array when the height measurement assembly moves at each height point, and acquiring a distance between adjacent reflected light patterns corresponding to each height point through the processing portion; and B4: performing a function fitting on the movement distance at each height point and the distance, between adjacent reflected light patterns, acquired at the corresponding height point to obtain the preset height acquisition model in a standard state.

Further, in step B4, the function fitting includes a neural network based fitting, a specific fitting method of which includes:

B41: acquiring a distance training set, the distance training set including a preset movement distance, at a preset height point, of the height measurement assembly and a preset distance between adjacent reflected light patterns at the corresponding height point; and B42: training a back propagation (BP) neural network through the distance training set to obtain the preset height acquisition model.

Further, in step A2, a specific method for the acquiring a target height of the assembly to be measured through a preset height acquisition model includes: acquiring a height corresponding to each preset movement distance through the preset height acquisition model according to each preset movement distance and the distance between adjacent reflected light patterns corresponding to each preset movement distance; and acquiring an average value of the heights corresponding to all the preset movement distances to serve as the target height, and outputting same.

Further, in step A1, the method further includes: determining whether the distance between adjacent reflected light patterns is within a preset range, and if not, outputting an error message.

Further, in step B3, a specific method for the acquiring a distance between adjacent reflected light patterns corresponding to each height point through the processing portion includes: acquiring the distance between adjacent reflected light patterns corresponding to each height point through the processing portion and a digital image correlation (DIC) method.

The present invention further provides a quality compensation method based on a height measurement assembly of a numerical control apparatus. The compensation method includes:

(1) performing a fitting on an extrusion height hp of the numerical control apparatus and a corresponding printing extrusion amount Fi in a pre-calibration stage to obtain a function relation $hp(Fi,\theta)$ of a theoretical basic height, $\theta$ being an identified set of other parameters affecting measurement of a target height;

(2) converting a three-dimensional model into a motion instruction through preset slice software, the motion instruction including an extrusion amount Fi, at each position, of a printing nozzle; and (3) measuring a target height of an actually-printed content in a layer through the height measurement assembly and calculating a corrected printing flow Fpi for implementing an expected height in a next layer after printing in each layer, and continuing to print based on the corrected printing flow Fpi in the next layer.

Further, a method for the obtaining a function relation $hp(Fi,\theta)$ of a theoretical basic height in a calibration process includes:

(11) collecting preset heights, within a preset height range, of the assembly to be measured, and driving the height measurement assembly to move by a preset distance in an X or Y direction through a motion mechanism of the height measurement assembly at each preset height;

(12) acquiring each reflected light pattern through a photoelectric signal collection array, and processing the pattern through a digital image correlation algorithm to obtain a movement distance of the pattern;

(13) performing a fitting of a preset function on each preset height and the movement distance of the pattern to obtain a function relation of the preset height;

(14) controlling movement distances, in the X or Y direction, of the height measurement assembly through a preset external positioning platform, and reading corresponding target heights;

(15) determining whether the read target heights are within the preset height range, and if not, outputting an error height; and

(16) acquiring an average value of the read target heights through the function relation of the height to serve as the extrusion height hp.

Further, step (3) specifically includes:

driving the printing nozzle and the height measurement assembly through a three-axis motion mechanism, recording a target height hj of an actually-printed content in the layer when the height measurement assembly passes through an area of a printed portion of the layer, calculating a difference $h_{difference}$ between the target height hj of the actually-printed content in the layer and an ideal printing height hi through a printing file, and calculating the corrected printing flow Fpi for implementing the expected height in the next layer through the difference $h_{difference}$ and the function relation $hp(Fi, \theta)$ of the theoretical basic height.

Further, in step (3), if the difference $h_{difference}$ between the target height hj of the actually-printed content in the layer and the ideal printing height hi is greater than or equal to a preset threshold ht, a failure result is output, and printing is stopped.

Preferably, the preset threshold ht is a set safety limit and determined according to a range of an extrusion flow of the printer. The extrusion flow of the printer is within a range, and the greater the flow is, the higher the height is. However, when the height is extraordinarily high, the printer is unable to provide such a large flow, a failure result is output, and printing is stopped.

The present invention further provides a quality compensation system based on a height measurement assembly of a numerical control apparatus. The quality compensation system includes:

a distance acquisition module configured for driving the height measurement assembly to move on a coordinate axis of the numerical control apparatus through a preset positioning mechanism on a plane to be measured of an assembly to be measured, so as to obtain a preset movement distance corresponding to each movement; and acquiring reflected light patterns of several planes to be measured through a photoelectric signal collection array in each movement process, and acquiring a distance between adjacent reflected light patterns through a processing portion;

a target height module configured for acquiring a target height of the assembly to be measured through a preset height acquisition model according to each preset movement distance and the distance between adjacent reflected light patterns corresponding to each preset movement distance;

a first function construction module configured for constructing a function relation $hp(Fi,\theta)$ of a theoretical basic height according to a printing extrusion amount Fi and an extrusion height hp, $\theta$ being an identified set of other parameters affecting measurement of the target height;

a conversion module configured for converting a three-dimensional model into a motion instruction through preset slice software, the motion instruction including an extrusion amount Fi, at each position, of a printing nozzle;

a collection module configured for collecting preset heights, within a preset height range, of the assembly to be measured; and driving the height measurement assembly to move by a preset distance in an X or Y direction through a motion mechanism of the height measurement assembly at each preset height, and recording each reflected light pattern through the photoelectric signal collection array in a movement process;

a data processing module configured for acquiring a movement distance of the pattern through a digital image correlation algorithm;

a second function construction module configured for performing a fitting of a preset function on each preset height and the movement distance of the pattern to obtain a function relation of the height;

a reading module configured for controlling movement distances, in the X or Y direction, of the height measurement assembly through a preset external positioning platform, and reading corresponding target heights;

a compensation module configured for calculating a corrected printing flow Fpi for implementing an expected height in a next layer;

an analysis and determination module configured for determining whether the read target heights are within the height range, and if not, outputting an error height; and an output module configured for acquiring an average value of the read target heights through the function relation of the height to serve as an extrusion height hp.

Further, a method for acquiring the preset height acquisition model includes:

a height point acquisition module configured for collecting several height points, within a standard height measurement range of the height measurement assembly, of a standard assembly; a motion module configured for driving the height measurement assembly to move on the coordinate axis of the numerical control apparatus by any distance through the preset positioning mechanism at each height point, so as to obtain a movement distance, at each height point, of the height measurement assembly; a pattern distance module configured for acquiring reflected light patterns of several standard planes through the photoelectric signal collection array when the height measurement assembly moves at each height point, and acquiring a distance between adjacent reflected light patterns corresponding to each height point through the processing portion; and a calculation module configured for performing a function fitting on the movement distance at each height point and the distance, between adjacent reflected light patterns, acquired at the corresponding height point to obtain the preset height acquisition model in a standard state.

Further, in the calculation module, the function fitting includes a neural network based fitting, a specific fitting method of which includes: acquiring a distance training set, the distance training set including a preset movement distance, at a preset height point, of the height measurement assembly and a preset distance between adjacent reflected light patterns at the corresponding height point; and training a back propagation (BP) neural network through the distance training set to obtain the preset height acquisition model.

Further, in the target height module, a specific method for the acquiring a target height of the assembly to be measured through a preset height acquisition model includes: acquiring a height corresponding to each preset movement distance through the preset height acquisition model according to each preset movement distance and the distance between adjacent reflected light patterns corresponding to each preset movement distance; and acquiring an average value of the heights corresponding to all the preset movement distances to serve as the target height, and outputting same.

Further, the compensation module includes driving the nozzle and the height measurement assembly through a three-axis motion mechanism after printing in each layer, recording a target height of an actually-printed content in the layer when the height measurement assembly passes through an area of a printed portion of the layer, calculating a difference $h_{difference}$ between the target height hj of the actually-printed content in the layer and an ideal height hi through a printing file, calculating the corrected printing flow Fpi for implementing the expected height in the next layer through the difference h difference and the function relation hp(Fi, θ) of the theoretical basic height, printing based on the corrected printing flow in the next layer, and outputting a failure result and stopping printing when hj−hi=>ht, ht being a preset threshold.

Further, the height measurement assembly includes a photoelectric signal collection array, a light source, a lens, and a processing portion, the light source being arranged on one side of the photoelectric signal collection array, light emitted out by the light source irradiating a plane to be measured, part of light reflected by the plane to be measured being received by the photoelectric signal collection array to obtain an electrical signal, and the electrical signal being processed by the processing portion to obtain height information.

On this basis, the present invention also provides a 3D printer that uses the above height measurement method, and/or the above quality compensation method, and/or the above height measurement system to perform height measurement during the printing process.

The present invention has the beneficial effects as follows:

(1) According to the present invention, the height measurement assembly is driven to move on the coordinate axis of the numerical control apparatus by any distance through the preset positioning mechanism at different height points; in the movement process, the distance between adjacent reflected light patterns corresponding to each height point is acquired through the processing portion, and the preset height acquisition model is constructed through the movement distance at each height point and the distance, between adjacent reflected light patterns, acquired at the corresponding height point; and the height of the assemblies to be measured of the same category may be repeatedly acquired through the preset height acquisition model, so that a measurement efficiency is dramatically improved while the problems of a high cost and low precision in the prior art are solved.

(2) According to the present invention, the problem that the processing head of the processing actuator is likely to interfere with the generation position of the workpiece to be processed when the contact switch is mounted on the processing actuator or the fixing frame to control the processing actuator to process and measure the workpiece to be processed is solved through the constructed preset height acquisition model, so that a cost is reduced while measurement precision is improved.

(3) According to the present invention, based on the characteristic that signals received by the photoelectric signal collection array have different results obtained through the digital image correlation (DIC) algorithm when the positioning assembly moves by the same distance at different heights, the function relation is constructed in the pre-calibration stage of product production, and repeatable height measurement is performed through the function relation, thereby solving the problems of a high cost and low precision in the prior art.

(4) According to the present invention, the function relation of the height is constructed in the pre-calibration stage through the function module, thereby solving the problem that by mounting the contact switch on the processing actuator or the fixing frame, the processing head of the processing actuator is likely to interfere with the generation position of the workpiece.

(5) The present invention compensates the printed content based on a measured printing height, thereby solving a height error, which is a main problem causing a deviation of the printed content, and has a lower cost and higher precision than a machine vision method based on a depth camera or a high-definition camera for shape compensation (precision of compensation performed through the high-definition camera is limited by a resolution of the camera and calibration conditions such as camera internal parameter-distortion).

DETAILED DESCRIPTION OF THE EMBODIMENTS

The specific embodiments of the present invention will be described in detail below with reference to the accompanying drawings. It should be noted that the examples are only specific illustrations of the present invention and should not be deemed as limiting the invention. An objective of the examples is to enable those skilled in the art to better understand and reproduce the technical solutions of the present invention, and the scope of protection of the present invention should still be subject to the scope defined by the claims.

In order to improve workpiece measurement precision, reduce a measurement cost, and improve a measurement efficiency, according to the present invention, a height measurement assembly is driven to move on a coordinate axis of a numerical control apparatus by any distance through a preset positioning mechanism at each collected height point; in a movement process, a distance between adjacent reflected light patterns corresponding to each height point is acquired through a processing portion, and a preset height acquisition model is constructed through a movement distance at each height point and the distance, between adjacent reflected light patterns, acquired at the corresponding height point; and a height of an assembly to be measured is acquired through the preset height acquisition model. Therefore, the problem that a processing head of a processing actuator is likely to interfere with a generation position of a workpiece to be processed when a contact switch is mounted on the processing actuator or a fixing frame to control the processing actuator to process and measure the workpiece to be processed is solved.

Example 1

Figure 1:
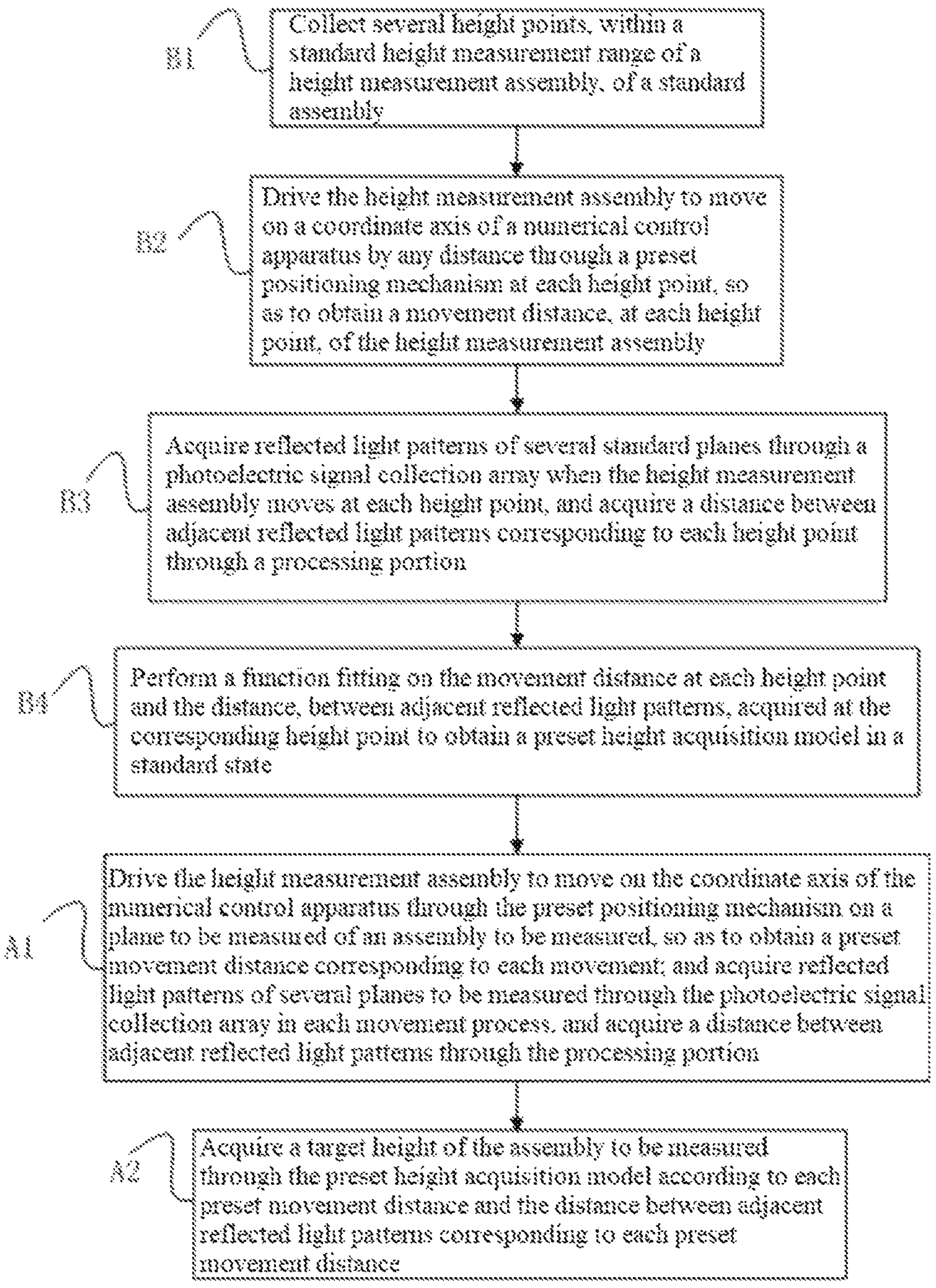
FIG. 1 is a step diagram of a height measurement method in Example 1.
Figure 2:
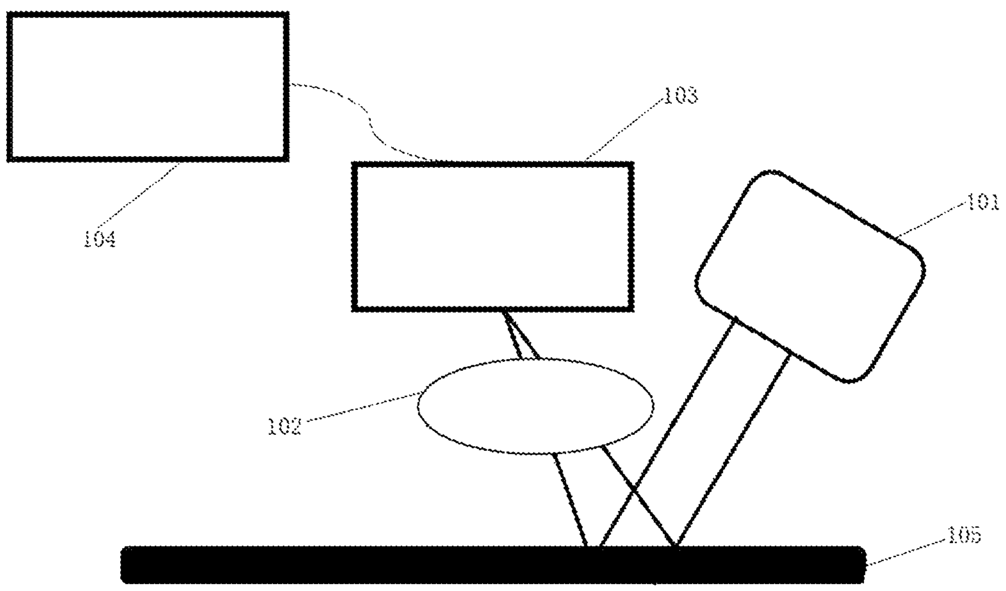
FIG. 2 is a modular diagram of a height measurement assembly in Example 1.

As shown in FIGS. 1-2, the present example provides a height measurement method based on a height measurement assembly of a numerical control apparatus. The height measurement assembly includes a photoelectric signal collection array 103, a light source 101, a lens 102, and a processing portion 104, the light source 101 being arranged on one side of the photoelectric signal collection array, light emitted out by the light source irradiating a plane to be measured of an assembly to be measured, and the lens being configured for focusing the light emitted out by the light source. The height measurement method principally includes:

A1: the height measurement assembly is driven to move on a coordinate axis of the numerical control apparatus through a preset positioning mechanism on the plane to be measured of the assembly to be measured, so as to obtain a preset movement distance corresponding to each movement; and reflected light patterns of several planes to be measured are acquired through the photoelectric signal collection array in each movement process, and a distance between adjacent reflected light patterns is acquired through the processing portion.

It is to be noted that during measurement, in step A1, the preset positioning mechanism may drive the height measurement assembly to move on the coordinate axis of the numerical control apparatus one or more times.

In step A1, the method further includes:

Whether the distance between adjacent reflected light patterns is within a preset range is determined, and if not, an error message is output.

In the present example, the distance between adjacent reflected light patterns should be within the preset range, if not, the preset positioning mechanism or a system may have a fault, or a height of the assembly to be measured may be out of a standard height measurement range of [h0–hn], and thus the error message is output, and processing is ended.

A2: a target height of the assembly to be measured is acquired through a preset height acquisition model according to each preset movement distance and the distance between adjacent reflected light patterns corresponding to each preset movement distance.

In step A2, a specific method for the step that a target height of the assembly to be measured is acquired through a preset height acquisition model includes:

- a height corresponding to each preset movement distance is acquired through the preset height acquisition model according to each preset movement distance and the distance between adjacent reflected light patterns corresponding to each preset movement distance; and
- an average value of the heights corresponding to all the preset movement distances is acquired to serve as the target height, and the target height is output.

In the present solution, in the measurement method in steps A1-A2, in each movement process, the photoelectric signal collection array may only acquire reflected light patterns of two planes to be measured; and a corresponding height may be acquired by inputting each (Yi,Li) in the preset height acquisition model, where i denotes a preset movement distance of an $i^{th}$ time, Yi denotes a distance between two reflected light patterns in an $i^{th}$ movement process, and Li denotes a preset movement distance in the corresponding movement process.

It is to be noted that a height of assemblies to be measured of the same category may be repeatedly acquired through the height acquisition model.

A method for acquiring the preset height acquisition model includes:

B1: several height points, within a standard height measurement range of the height measurement assembly, of a standard assembly are collected.

In the present solution, n height points {h0, h1, h2, hn} of the standard assembly are collected within the standard height measurement range [h0–hn], where n is a positive integer greater than 1, and the height points may be sampled at equal intervals or random intervals.

B2: the height measurement assembly is driven to move on the coordinate axis of the numerical control apparatus by any distance through the preset positioning mechanism at each height point, so as to obtain a movement distance, at each height point, of the height measurement assembly.

Specifically, the height measurement assembly is driven to move by distances {L0, L1, L2, . . . Lm} in an X and/or Y direction of the coordinate axis of the numerical control apparatus through the preset positioning mechanism at all the height points, where m is a positive integer greater than or equal to zero, L0 denotes a movement distance at a first height point, L1 denotes a movement distance at a second height point, and so on.

B3: reflected light patterns of several standard planes are acquired through the photoelectric signal collection array when the height measurement assembly moves at each height point, and a distance between adjacent reflected light patterns corresponding to each height point is acquired through the processing portion.

In step B3, a specific method for the step that a distance between adjacent reflected light patterns corresponding to each height point is acquired through the processing portion includes:

The distance between adjacent reflected light patterns corresponding to each height point is acquired through the processing portion and a digital image correlation (DIC) method.

The processing portion includes arithmetic units such as an analog-to-digital converter (ADC) and a microcontroller unit (MCU) (or a field programmable gate array (FPGA) or a digital signal processor (DSP)). The processing portion may receive an analog signal of the reflected light pattern acquired by the photoelectric signal collection array, and convert the analog signal into a digital signal for processing.

It is to be noted that when the height measurement assembly moves at each height point, the photoelectric signal collection array records a series of reflected light patterns. Since the heights are different, but a height for light ray focusing is fixed, the reflected light patterns at different positions are different. Movement distances {{Y00, Y10, Y20 . . . Yn0} . . . {Y0m, Y1m, Y2m . . . Ynm}} of the series of reflected light patterns are acquired through digital image correlation (DIC) processing, where {Y00, Y10, Y20 . . . Yn0} denotes a distance, between adjacent reflected light patterns, acquired at the first height point, and the digital image correlation method may be a global DIC algorithm or a local DIC algorithm.

B4: a function fitting is performed on the movement distance at each height point and the distance, between adjacent reflected light patterns, acquired at the corresponding height point to obtain the preset height acquisition model in a standard state.

It is to be noted that the function fitting method may be a least square method, a gradient descent method, or a neural network model construction method.

In step B4, the function fitting includes a neural network based fitting, a specific fitting method of which includes:

B41: a distance training set is acquired, the distance training set including a preset movement distance, at a preset height point, of the height measurement assembly and a preset distance between adjacent reflected light patterns at the corresponding height point; and B42: a back propagation (BP) neural network is trained through the distance training set to obtain the preset height acquisition model.

Example 2

Figure 3:
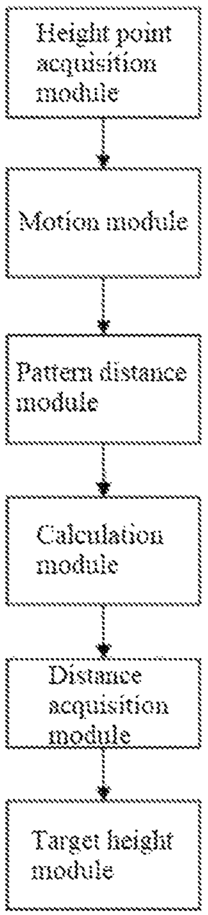
FIG. 3 is a modular diagram of a height measurement system in Example 2.

As shown in FIG. 3, the present example provides a height measurement system based on a height measurement assembly of a numerical control apparatus. The height measurement assembly includes a photoelectric signal collection array, a light source, a lens, and a processing portion, the light source being arranged on one side of the photoelectric signal collection array, light emitted out by the light source irradiating a plane to be measured of an assembly to be measured, and the lens being configured for focusing the light emitted out by the light source. The height measurement system principally includes:

a distance acquisition module configured for driving the height measurement assembly to move on a coordinate axis of the numerical control apparatus through a preset positioning mechanism on the plane to be measured of the assembly to be measured, so as to obtain a preset movement distance corresponding to each movement; and acquiring reflected light patterns of several planes to be measured through the photoelectric signal collection array in each movement process, and acquiring a distance between adjacent reflected light patterns through the processing portion; and a target height module configured for acquiring a target height of the assembly to be measured through a preset height acquisition model according to each preset movement distance and the distance between adjacent reflected light patterns corresponding to each preset movement distance.

According to the present invention, the problem that a processing head of a processing actuator is likely to interfere with a generation position of a workpiece to be processed when a contact switch is mounted on the processing actuator or a fixing frame to control the processing actuator to process and measure the workpiece to be processed is solved through the constructed preset height acquisition model, so that a cost is reduced while measurement precision is improved.

In the target height module, a specific method for the acquiring a target height of the assembly to be measured through a preset height acquisition model includes: a height corresponding to each preset movement distance is acquired through the preset height acquisition model according to each preset movement distance and the distance between adjacent reflected light patterns corresponding to each preset movement distance; and an average value of the heights corresponding to all the preset movement distances is acquired to serve as the target height, and the target height is output.

A method for acquiring the preset height acquisition model includes:

- a height point acquisition module configured for collecting several height points, within a standard height measurement range of the height measurement assembly, of a standard assembly;
- a motion module configured for driving the height measurement assembly to move on the coordinate axis of the numerical control apparatus by any distance through the preset positioning mechanism at each height point, so as to obtain a movement distance, at each height point, of the height measurement assembly;
- a pattern distance module configured for acquiring reflected light patterns of several standard planes through the photoelectric signal collection array when the height measurement assembly moves at each height point, and
- acquiring a distance between adjacent reflected light patterns corresponding to each height point through the processing portion; and
- a calculation module configured for performing a function fitting on the movement distance at each height point and the distance, between adjacent reflected light patterns, acquired at the corresponding height point to obtain the preset height acquisition model in a standard state.

In the calculation module, the function fitting includes a neural network based fitting, a specific fitting method of which includes: a distance training set is acquired, the distance training set including a preset movement distance, at a preset height point, of the height measurement assembly and a preset distance between adjacent reflected light patterns at the corresponding height point; and a BP neural network is trained through the distance training set to obtain the preset height acquisition model.

Example 3

Figure 4:
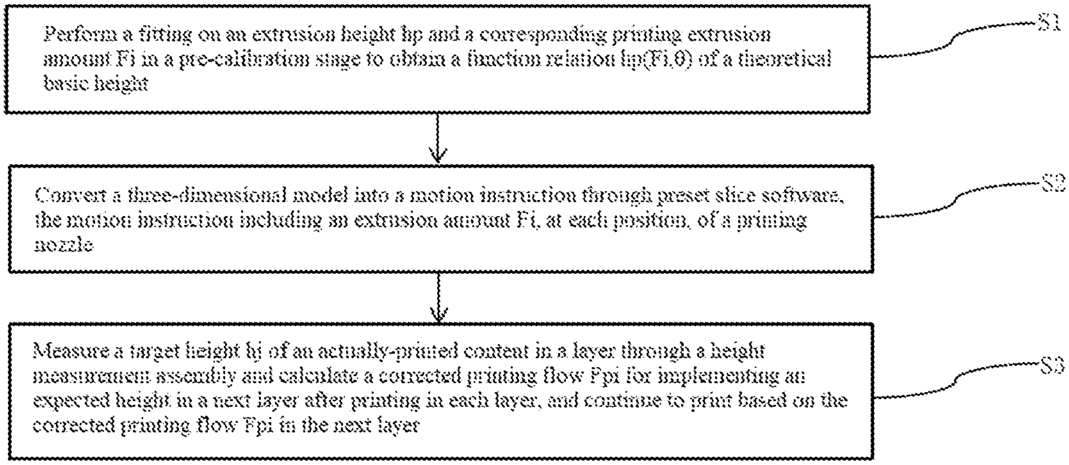
FIG. 4 is a flowchart a compensation method in Example 3.

As shown in FIG. 4, the present example provides a quality compensation method based on a height measurement assembly of a numerical control apparatus. The compensation method is configured for compensating a target height measured through the height measurement method in Example 1 and includes:

S1, a fitting is performed on an extrusion height hp and a corresponding printing extrusion amount Fi in a pre-calibration stage to obtain a function relation hp(Fi,θ) of a theoretical basic height, θ being an identified set of other parameters affecting measurement of the target height.

Figure 5:
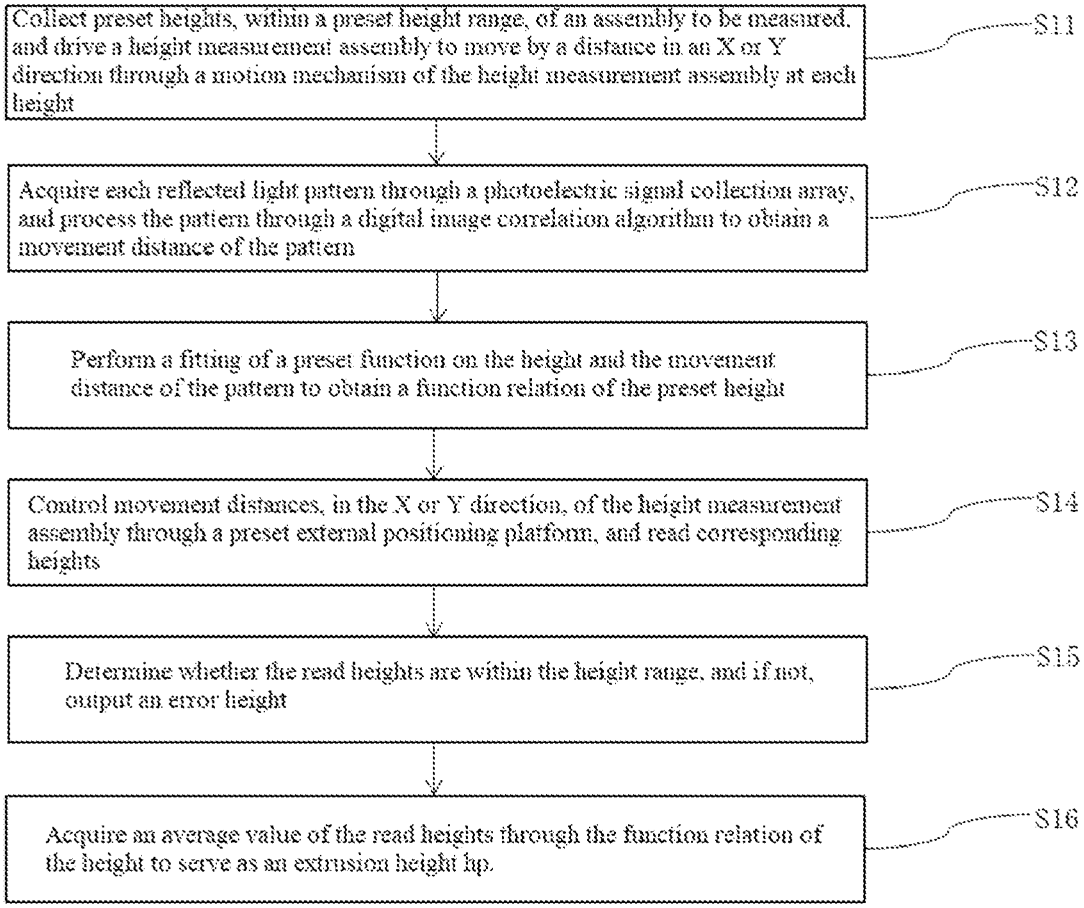
FIG. 5 is a flowchart of acquiring hp(Fi,θ) in Example 3.

As shown in FIG. 5, a method for the obtaining hp(Fi,θ) in a calibration process includes:

S11, n heights {h0, h1, h2, hn} are preset in a height range [h0–hn], where n is a positive integer greater than 1; and preset heights, within the preset height range [h0–hn], of an assembly to be measured are collected, and the height measurement assembly is driven to move by distances {L0, L1, L2 . . . Lm} in an X or Y direction through a motion mechanism of the height measurement assembly, where m is a positive integer greater than or equal to zero, the heights may be sampled at equal intervals or randomly.

A series of preset heights and a series of movement distances in the X or Y direction are collected through other sensors. Then a movement distance of a pattern is acquired through a digital correlation algorithm, and a function relation is acquired according to the movement distance in the X or Y direction and the movement distance of the pattern.

A specific step for acquiring the extrusion height hp includes: A1: the height measurement assembly is driven to move on a coordinate axis of the numerical control apparatus through a preset positioning mechanism on a plane to be measured of an assembly to be measured, so as to obtain a preset movement distance corresponding to each movement; and reflected light patterns of several planes to be measured are acquired through a photoelectric signal collection array in each movement process, and a distance between adjacent reflected light patterns is acquired through a processing portion; and A2: a target height of the assembly to be measured is acquired through a preset height acquisition model according to each preset movement distance and the distance between adjacent reflected light patterns corresponding to each preset movement distance.

S12, each preset reflected light pattern is acquired through the photoelectric signal collection array. Since the heights are different, but a height for light ray focusing is fixed, digital patterns at different positions are different. Movement distances {{Y00,Y10,Y20 Yn0} . . . {Y0m,Y1m, Y2m . . . Ynm}} of different patterns are acquired through digital image correlation (DIC) processing.

The digital image correlation method may be a global DIC algorithm or a local DIC algorithm.

S13, a fitting of a preset function is performed on the height and the movement distance of the pattern to obtain a function relation h(Yi,Li) of the preset height, where Yi is the movement distance of the pattern, and Li is the height.

Fitting methods include a least square method, a gradient descent method, and/or a neural network based method. The neural network based method may employ a BP neural network, Yi and Li are input, hi is output, and m fully-connected hidden layers are provided therebetween.

S14, movement distances {L0, L1, L2 . . . Lx} (m>=0, and x is a positive integer), in the X or Y direction, of the height measurement assembly are controlled through a preset external positioning platform, and corresponding heights {Y0, Y1, Y2 . . . Ym} are read.

S15, whether the read heights are within the height range is determined, if not, the external positioning platform or a system may have a fault, or the height of the apparatus is out of the range [h0–hn], and an error height is output.

S16, an average value of the read heights is acquired through the function relation of the height to serve as the extrusion height hp.

A printing extrusion amount Fi of a printing nozzle is controlled through a control panel of a 3D printer, and an extrusion height hp corresponding to a preset extrusion amount is measured through the height measurement assembly or one or more of a laser radar, a laser ranging sensor, and an ultrasonic sensor. According to measurement, a function fitting is performed on the extrusion height hp and the printing extrusion amount Fi through a neural network algorithm, and the control panel of the printer adjusts a rotation speed of an electric motor or a pressure of a pump body which is responsible for an extruded portion in the nozzle, so as to adjust the extrusion amount.

S2, a three-dimensional model is converted into a motion instruction through preset slice software, the motion instruction including an extrusion amount Fi, at each position, of the printing nozzle. Preferably, the motion instruction refers to an instruction for controlling the printing nozzle of the printer when and where to go.

S3, a target height hj of an actually-printed content in a layer is measured through the height measurement assembly and a corrected printing flow Fpi for implementing an expected height in a next layer is calculated after printing in each layer, and printing continues to be performed based on the corrected printing flow Fpi in the next layer.

The printing nozzle and the height measurement assembly are driven through a three-axis motion mechanism, the target height hj of the actually-printed content in the layer is recorded when the height measurement assembly passes through an area of a printed portion of the layer, a difference $h_{difference}$ between the target height hj of the actually-printed content in the layer and an ideal printing height hi is calculated through a printing file, the difference $h_{difference}$ is supplemented with a flow through the function relation hp(Fi,θ) of the theoretical basic height, and the corrected printing flow Fpi for implementing the expected height in the next layer is calculated.

If the difference $h_{difference}$ between the target height hj of the actually-printed content in the layer and the ideal printing height hi is greater than or equal to a preset threshold ht, a failure result is output, and printing is stopped. The preset threshold ht is a set safety limit and determined according to a range of an extrusion flow of the printer. The extrusion flow of the printer is within a range, and the greater the flow is, the higher the height is. However, when the height is extraordinarily high, the printer is unable to provide such a large flow, a failure result is output, and printing is stopped.

As shown in FIG. 2, the height measurement assembly includes a light source 101, a lens 102, the photoelectric signal collection array 103, and the processing portion 104, the light source 101 being arranged on one side of the photoelectric signal collection array 103, light emitted out by the light source 101 irradiating the plane 105 to be measured, part of light reflected by the plane 105 to be measured being received by the photoelectric signal collection array 103 to obtain an electrical signal, and the electrical signal being processed by the processing portion to obtain height information.

The light source may be a light-emitting diode (LED) light source or a laser light source, the lens is configured for focusing the light of the light source near the plane to be measured, the photoelectric signal collection array is configured in coordination with a wavelength of the light source, and may be a complementary metal oxide semiconductor (CMOS) or a charge coupled device (CCD), or a photodiode array, the processing portion may receive an analog signal of the photoelectric signal collection array and convert the analog signal into a digital signal for processing, and the processing portion includes arithmetic units such as an analog-to-digital converter (ADC) and an MCU or an FPGA or a DSP.

In some preferred solutions, the height measurement assembly is relatively and fixedly connected to the printing nozzle, and moves along with a movement of the printing nozzle, or the printing nozzle and the height measurement assembly are fixed all the time. At least one height measurement assembly is configured on one side of the printing nozzle.

Example 4

Figure 6:
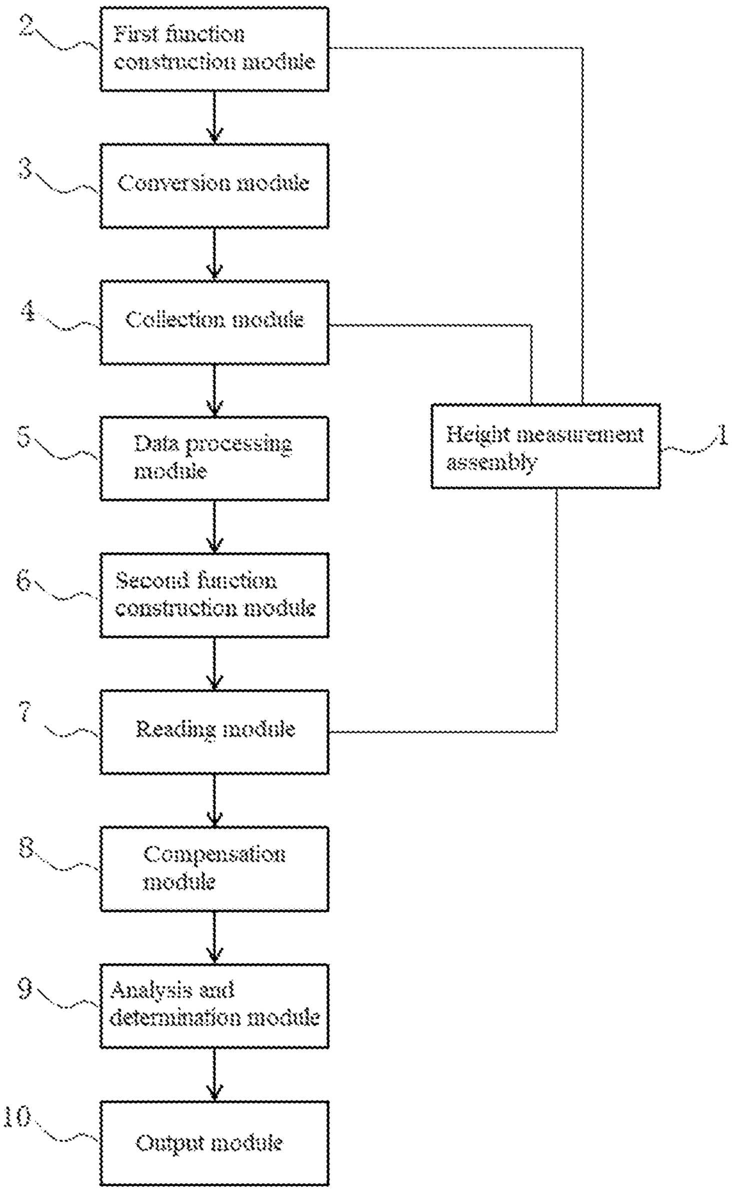
FIG. 6 is a modular diagram of a compensation system in Example 4.

As shown in FIG. 6, the present example provides a quality compensation system based on a height measurement assembly of a numerical control apparatus. The compensation system includes:

a height measurement assembly 1 configured for measuring a printing height and including a photoelectric signal collection array, a light source, a lens, and a processing portion, the light source being arranged on one side of the photoelectric signal collection array, light emitted out by the light source irradiating a plane to be measured, part of light reflected by the plane to be measured being received by the photoelectric signal collection array to obtain an electrical signal, and the electrical signal being processed by the processing portion to obtain height information;

a first function construction module 2 configured for constructing a function relation hp(Fi,θ) of a theoretical basic height according to a printing extrusion amount Fi and an extrusion height hp, θ being an identified set of other parameters affecting measurement of a target height;

a conversion module 3 configured for converting a three-dimensional model into a motion instruction through preset slice software, the motion instruction including an extrusion amount Fi, at each position, of a printing nozzle;

a collection module 4 configured for collecting all preset heights, within a preset height range, of an assembly to be measured; and driving the height measurement assembly to move by a preset distance in an X or Y direction through a motion mechanism of the height measurement assembly at each preset height, and recording each reflected light pattern through the photoelectric signal collection array in a movement process;

a data processing module 5 configured for acquiring a movement distance of the pattern through a digital image correlation algorithm;

a second function construction module 6 configured for performing a fitting of a preset function on the height and the movement distance of the pattern to obtain a function relation of the height;

according to the present invention, through the second function construction module 6, the function relation of the height is constructed in a pre-calibration stage, so that the problem that a processing head of a processing actuator is likely to interfere with a generation position of a workpiece when a contact switch is mounted on the processing actuator or a fixing frame is solved; and based on the characteristic that signals received by the photoelectric signal collection array have different results obtained through the DIC algorithm when the positioning assembly moves by the same distance at different heights, the function relation is constructed in the pre-calibration stage, and repeatable height measurement is performed through the function relation, thereby solving the problems of a high cost and low precision in the prior art;

a reading module 7 configured for controlling movement distances, in the X or Y direction, of the height measurement assembly through a preset external positioning platform, and reading corresponding heights;

a compensation module 8 configured for calculating a corrected printing flow Fpi for implementing an expected height in a next layer, driving a nozzle and the height measurement assembly through a three-axis motion mechanism after printing in each layer, recording a target height hj of an actually-printed content in the layer when the height measurement assembly passes through an area of a printed portion of the layer, calculating a difference $h_{difference}$ between the target height hj of the actually-printed content in the layer and an ideal height hi through a printing file, calculating the corrected printing flow Fpi for implementing the expected height in the next layer through the difference $h_{difference}$ and the function relation hp(Fi, θ) of the theoretical basic height, printing based on the corrected printing flow in the next layer, and outputting a failure result and stopping printing when hj−hi=>ht, ht being a preset threshold;

an analysis and determination module 9 configured for determining whether the read corresponding heights are within the height range, and if not, outputting an error height; and an output module 10 configured for acquiring an average value of the read corresponding heights through the function relation of the height to serve as an output result.

According to the present invention, the height measurement assembly is driven to move on a coordinate axis of the numerical control apparatus by any distance through a preset positioning mechanism at different height points; in a movement process, a distance between adjacent reflected light patterns corresponding to each height point is acquired through the processing portion, and a preset height acquisition model is constructed through the movement distance at each height point and the distance, between adjacent reflected light patterns, acquired at the corresponding height point; a height of assemblies to be measured of the same category may be repeatedly acquired through the preset height acquisition model, so that a measurement efficiency is dramatically improved while the problems of a high cost and low precision in the prior art are solved.

Example 5

This embodiment is an application of the present invention, which provides a 3D printer that can use the height measurement method, and/or the quality compensation method, and/or the height measurement system in the above embodiment to perform height measurement during the printing process.

While the preferred examples of the present application have been described, those skilled in the art can make additional changes and modifications to these examples once they learn the basic creative concepts. Therefore, the appended claims are intended to be interpreted as including the preferred examples and all changes and modifications falling within the scope of the present application.

What is claimed is:

1. A 3D printer, wherein the 3D printer uses a height measurement method based on a height measurement assembly of a numerical control apparatus, wherein the height measurement assembly comprises a photoelectric signal collection array, a light source, a lens, and a processing portion, the light source being arranged on one side of the photoelectric signal collection array, light emitted out by the light source irradiating a plane to be measured of an assembly to be measured, and the lens being configured for focusing the light emitted out by the light source; and the height measurement method principally comprises:

A1: driving the height measurement assembly to move on a coordinate axis of the numerical control apparatus through a preset positioning mechanism on the plane to be measured of the assembly to be measured, so as to obtain a preset movement distance corresponding to each movement; and acquiring reflected light patterns of several planes to be measured through the photoelectric signal collection array in each movement process, and acquiring a distance between adjacent reflected light patterns through the processing portion; and A2: acquiring a target height of the assembly to be measured through a preset height acquisition model according to each preset movement distance and the distance between adjacent reflected light patterns corresponding to each preset movement distance, and a quality compensation method based on the height measurement assembly of the numerical control apparatus, wherein the quality compensation method is configured for compensating the target height measured through the height measurement method; and the compensation method comprises:

(1) performing a fitting on an extrusion height hp of the numerical control apparatus and a corresponding printing extrusion amount Fi in a pre-calibration stage to obtain a function relation hp(Fi,θ) of a theoretical basic height, θ being an identified set of other parameters affecting measurement of the target height;

(2) converting a three-dimensional model into a motion instruction through preset slice software, the motion instruction comprising an extrusion amount Fi, at each position, of a printing nozzle; and (3) measuring the target height of an actually-printed content in a layer through the height measurement assembly and calculating a corrected printing flow Fpi for implementing an expected height in a next layer after printing in each layer, and continuing to print based on the corrected printing flow Fpi in the next layer, and a height measurement system based on the height measurement assembly of the numerical control apparatus, wherein the height measurement system is suitable for the compensation method and comprises:

a distance acquisition module configured for driving the height measurement assembly to move on the coordinate axis of the numerical control apparatus through the preset positioning mechanism on the plane to be measured of the assembly to be measured, so as to obtain the preset movement distance corresponding to each movement; and acquiring the reflected light patterns of several planes to be measured through the photoelectric signal collection array in each movement process, and acquiring the distance between adjacent reflected light patterns through the processing portion;

a target height module configured for acquiring the target height of the assembly to be measured through the preset height acquisition model according to each preset movement distance and the distance between the adjacent reflected light patterns corresponding to each preset movement distance;

a first function construction module configured for constructing the function relation hp(Fi,θ) of the theoretical basic height according to the printing extrusion amount Fi and the extrusion height hp, θ being the identified set of the other parameters affecting the measurement of the target height;

a conversion module configured for converting the three-dimensional model into the motion instruction through preset slice software, the motion instruction comprising the corresponding extrusion amount Fi, at each position, of the printing nozzle;

a collection module configured for collecting preset heights, within a preset height range, of the assembly to be measured; and driving the height measurement assembly to move by a preset distance in an X or Y direction through a motion mechanism of the height measurement assembly at each preset height, and recording each reflected light pattern through the photoelectric signal collection array in a movement process;

a data processing module configured for acquiring a movement distance of the pattern through a digital image correlation algorithm;

a second function construction module configured for performing a fitting of a preset function on each preset height and the movement distance of the pattern to obtain a function relation of the height;

a reading module configured for controlling movement distances, in the X or Y direction, of the height measurement assembly through a preset external positioning platform, and reading corresponding target heights;

a compensation module configured for calculating the corrected printing flow Fpi for implementing the expected height in the next layer;

an analysis and determination module configured for determining whether the read target heights are within the height range, and if not, outputting an error height; and an output module configured for acquiring an average value of the read target heights through the function relation of the height to serve as an extrusion height hp, to perform height measurement during the printing process.

2. The 3D printer according to claim 1, wherein the height measurement method further comprises a method for acquiring the preset height acquisition model, and the method for acquiring the preset height acquisition model comprises:

B1: collecting several height points, within a standard height measurement range of the height measurement assembly, of a standard assembly;

B2: driving the height measurement assembly to move on the coordinate axis of the numerical control apparatus by any distance through the preset positioning mechanism at each height point, so as to obtain a movement distance, at each height point, of the height measurement assembly;

B3: acquiring reflected light patterns of several standard planes through the photoelectric signal collection array when the height measurement assembly moves at each height point, and acquiring a distance between adjacent reflected light patterns corresponding to each height point through the processing portion; and B4: performing a function fitting on the movement distance at each height point and the distance, between adjacent reflected light patterns, acquired at the corresponding height point to obtain the preset height acquisition model in a standard state.

3. The 3D printer according to claim 2, wherein in step B4, the function fitting comprises a neural network based fitting, a specific fitting method of which comprises:

B41: acquiring a distance training set, the distance training set comprising a preset movement distance, at a preset height point, of the height measurement assembly and a preset distance between adjacent reflected light patterns at the corresponding height point; and B42: training a back propagation (BP) neural network through the distance training set to obtain the preset height acquisition model.

4. The 3D printer according to claim 3, wherein in step A2, acquiring the target height of the assembly to be measured through the preset height acquisition model comprises: acquiring a height corresponding to each preset movement distance through the preset height acquisition model according to each preset movement distance and the distance between adjacent reflected light patterns corresponding to each preset movement distance; and acquiring an average value of the heights corresponding to all the preset movement distances to serve as the target height, and outputting same.

5. The 3D printer according to claim 4, wherein in step B3, acquiring the distance between the adjacent reflected light patterns corresponding to each height point through the processing portion comprises: acquiring the distance between adjacent reflected light patterns corresponding to each height point through the processing portion and a digital image correlation method.

6. The 3D printer according to claim 1, further comprising in step A1, determining whether the distance between the adjacent reflected light patterns is within a preset range, and if not, outputting an error message.

7. The 3D printer according to claim 1, wherein obtaining the function relation hp(Fi,θ) of the theoretical basic height in a calibration process comprises:

(11) collecting preset heights, within a preset height range, of the assembly to be measured, and driving the height measurement assembly to move by a preset distance in an X or Y direction through a motion mechanism of the height measurement assembly at each preset height;

(12) acquiring each reflected light pattern through the photoelectric signal collection array, and processing the pattern through a digital image correlation algorithm to obtain the movement distance of the pattern;

(13) performing the fitting of the preset function on each preset height and the movement distance of the pattern to obtain a function relation of the preset height;

(14) controlling movement distances, in the X or Y direction, of the height measurement assembly through a preset external positioning platform, and reading corresponding target heights;

(15) determining whether the read target heights are within the preset height range, and if not, outputting the error height; and

(16) acquiring the average value of the read target heights through the function relation of the height to serve as the extrusion height hp.

8. The 3D printer according to claim 1, wherein step (3) comprises: driving the printing nozzle and the height measurement assembly through a three-axis motion mechanism, recording the target height hj of an actually-printed content in the layer when the height measurement assembly passes through an area of a printed portion of the layer, calculating a difference $h_{difference}$ between the target height hj of the actually-printed content in the layer and an ideal printing height hi through a printing file, and calculating the corrected printing flow Fpi for implementing the expected height in the next layer through the difference $h_{difference}$ and the function relation hp(Fi,θ) of the theoretical basic height.

9. The 3D printer according to claim 8, wherein in step (3), when the difference $h_{difference}$ between the target height hj of the actually-printed content in the layer and the ideal printing height hi is greater than or equal to a preset threshold ht, a failure result is output, and printing is stopped.

10. The 3D printer according to claim 1, wherein the preset height acquisition model comprises:

a height point acquisition module configured for collecting several height points, within a standard height measurement range of the height measurement assembly, of a standard assembly; a motion module configured for driving the height measurement assembly to move on the coordinate axis of the numerical control apparatus by any distance through the preset positioning mechanism at each height point, so as to obtain a movement distance, at each height point, of the height measurement assembly; a pattern distance module configured for acquiring reflected light patterns of several standard planes through the photoelectric signal collection array when the height measurement assembly moves at each height point, and acquiring the distance between the adjacent reflected light patterns corresponding to each height point through the processing portion; and a calculation module configured for performing a function fitting on the movement distance at each height point and the distance, between adjacent reflected light patterns, acquired at the corresponding height point to obtain the preset height acquisition model in a standard state.

11. The 3D printer according to claim 10, wherein in the calculation module, the function fitting comprises a neural network based fitting, a specific fitting method of which comprises: acquiring a distance training set, the distance training set comprising a preset movement distance, at a preset height point, of the height measurement assembly and a preset distance between adjacent reflected light patterns at the corresponding height point; and training a back propagation (BP) neural network through the distance training set to obtain the preset height acquisition model.

12. The 3D printer according to claim 11, wherein in the target height module, acquiring the target height of the assembly to be measured through the preset height acquisition model comprises: acquiring a height corresponding to each preset movement distance through the preset height acquisition model according to each preset movement distance and the distance between adjacent reflected light patterns corresponding to each preset movement distance; and acquiring an average value of the heights corresponding to all the preset movement distances to serve as the target height, and outputting same.

13. The 3D printer according to claim 1, wherein the compensation module comprises driving the printing nozzle and the height measurement assembly through a three-axis motion mechanism after printing in each layer, recording a target height of an actually-printed content in the layer when the height measurement assembly passes through an area of a printed portion of the layer, calculating a difference $h_{difference}$ between the target height hj of the actually-printed content in the layer and an ideal height hi through a printing file, calculating the corrected printing flow Fpi for implementing the expected height in the next layer through the difference $h_{difference}$ and the function relation hp(Fi,θ) of the theoretical basic height, printing based on the corrected printing flow in the next layer, and outputting a failure result and stopping printing when hj−hi=>ht, ht being a preset threshold.

14. The 3D printer according to claim 1, wherein a part of light reflected by the plane to be measured is received by the photoelectric signal collection array to obtain an electrical signal, and the electrical signal is processed by the processing portion to obtain height information.

* * * * *